(12) United States Patent
Sperandeo (10) Patent No.: US 8,725,624 B2
(45) Date of Patent: *May 13, 2014

(54) COMPUTERIZED INVESTMENT PRODUCT

(75) Inventor: Victor Sperandeo, Dallas, TX (US)

(73) Assignee: Alpha Financial Technologies, LLC, Grapevine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,173

(22) Filed: Feb. 2, 2012

(65) Prior Publication Data

US 2012/0173458 A1    Jul. 5, 2012

Related U.S. Application Data

(60) Continuation of application No. 10/987,581, filed on Nov. 12, 2004, now Pat. No. 8,150,758, which is a division of application No. 09/267,186, filed on Mar. 12, 1999, now Pat. No. 6,856,971.

(51) Int. Cl.
*G06Q 40/06*    (2012.01)

(52) U.S. Cl.
USPC ............................ 705/37; 705/36 R; 705/35

(58) Field of Classification Search
USPC ............................................. 705/35, 37, 36 R
See application file for complete search history.

(56) References Cited

U.S. PATENT DOCUMENTS

| | | | |
|---|---|---|---|
| 4,597,046 A | 6/1986 | Musmanno et al. | |
| 4,722,055 A | 1/1988 | Roberts | |
| 4,839,804 A | 6/1989 | Roberts et al. | |
| 5,083,782 A | 1/1992 | Nilssen | |
| 5,101,353 A | 3/1992 | Lupien et al. | |
| 5,126,936 A | 6/1992 | Champion et al. | |
| 5,193,056 A | 3/1993 | Boes | |
| 5,631,828 A * | 5/1997 | Hagan | 705/4 |
| 5,692,233 A | 11/1997 | Garman | |
| 5,797,127 A | 8/1998 | Walker et al. | |
| 5,806,048 A | 9/1998 | Kiron et al. | |
| 5,812,987 A | 9/1998 | Luskin et al. | |
| 5,819,238 A | 10/1998 | Fernholz | |
| 5,852,811 A | 12/1998 | Atkins | |

(Continued)

FOREIGN PATENT DOCUMENTS

EP    0243035 A2    10/1987

OTHER PUBLICATIONS

LTCM a hedge fund above suspicion by Ibrahim Warde, Nov. 1998.*

(Continued)

*Primary Examiner* — James A Vezeris
(74) *Attorney, Agent, or Firm* — Daniel J. Chalker; Edwin S. Flores; Chalker Flores, LLP (57) ABSTRACT

A computer implemented investment product includes data stored on one or more computers that corresponds to a notional performance portfolio of assets. The notional performance portfolio includes: (a) a base portfolio of assets having a selected exposure amount; (b) a passive commodity index portfolio, of long and short positions, having a passive commodity index portfolio exposure in an amount substantially equal to a product of the selected exposure amount multiplied by a leverage factor of at least 100%; and (c) the notional performance portfolio having a lower risk and a higher return as compared to either the base portfolio or the passive commodity index portfolio. The one or more computers monitor the base portfolio and the passive commodity index portfolio and calculate the return for the notional performance portfolio.

36 Claims, 4 Drawing Sheets

(56) References Cited

U.S. PATENT DOCUMENTS

| | | | |
|---|---|---|---|
| 5,873,071 A | | 2/1999 | Ferstenberg et al. |
| 5,884,283 A | | 3/1999 | Manos |
| 5,884,285 A | | 3/1999 | Atkins |
| 5,884,286 A | | 3/1999 | Daughtery, III |
| 5,911,136 A | | 6/1999 | Atkins |
| 5,946,667 A | | 8/1999 | Tull, Jr. et al. |
| 6,064,985 A | * | 5/2000 | Anderson .................... 705/36 R |

OTHER PUBLICATIONS

Strategy for Stocks, Options, "Weighing Your Options in Options," http://www.businessweek.com|1997/52/b3559051.html, Dec. 29, 1997, 4 pages.

J.P. Morgan/Reuters, "RiskMetrics—Technical Document," New York, Dec. 17, 1996, Fourth Edition, 296 pages.

Schneeweis, Thomas, et al., "Comparisons of Commodity and Managed Futures Benchmark Indices," CISDM Working paper Series, Aug. 2, 1996, 25 pages.

Barr, P., SEI Sets Passive Managed Futures Investments, Pensions & investments, Sep. 19, 1994, p. 55.

Dictionary of Finance and Investment Terms, 5th Ed. John Downes and Jordan Elliot Goodman, New York: Barron (1998), pp. 80-83, 272-275, 402-403, 604-605.

Gray, G., Municipal Derivative Securities Uses and Valuation. Irwin Professional Publishing. 1995, pp. 151-168.

The Handbook of Managed Funds, Ed. Carl Peters and Ben Warwick, McGraw-Hill (1997), pp. 8-12, 21-23, 25, 33, 41-43.

Jacob, N., Portfolio Management and Non-Traditional Investing. Trusts and Estates, Jun. 1995, pp. 14-32.

Litner, P., "The Proposed Role of Managed Commodity-Financial Futures Accounts in Portfolios of Stocks and Bonds," May 16, 1983 (retrieved Jun. 1, 2000), Retrieved from the Internet: www.scaletrading.com/lintner.htm.

MacAlister, P., "Share Yourself Around," Management-Auckland, Apr. 1998, vol. 45, No. 3, pp. 49-53.

Miller, T., "Beating Index Funds with Derivatives," Journal of Portfolio Management, May 1999, pp. 75-76.

Money Manager Interview. Sep. 2, 1991, Wall Street Transcript Digest, vol. 1, n10.

Schneeweis, T., "Comparisons of Commodity aqnd Managed Futures Benchmark Indices," CISDM Working Paper Series, (1996).

Warsager, R., "Institutions Make Their Move," Futures-Cedar Falls, Jun. 1999, vol. 28, No. 6, pp. 72-76.

Warde, Ibrahim, "LTCM, a Hedge Fund Above Suspicion, " Nov. 1998, 4 pages.

* cited by examiner

COMPUTERIZED INVESTMENT PRODUCT

PRIORITY CLAIM AND CROSS-REFERENCE TO RELATED APPLICATIONS

This patent application is a continuation application of U.S. patent application Ser. No. 10/987,581 filed on Nov. 12, 2004, now U.S. Pat. No. 8,150,758, which is a divisional application of U.S. patent application Ser. No. 09/267,186 filed on Mar. 12, 1999, now U.S. Pat. No. 6,856,971. All of the foregoing applications are hereby incorporated by reference in their entirety.

This patent application is related to: (a) U.S. patent application Ser. No. 10/987,585 filed on Nov. 12, 2004, now U.S. Pat. No. 7,860,779, which is a divisional application of U.S. patent application Ser. No. 09/267,186 filed on Mar. 12, 1999, now U.S. Pat. No. 6,856,971; (b) U.S. patent application Ser. No. 10/987,584 filed on Nov. 12, 2004, which is a divisional application of U.S. patent application Ser. No. 09/275,758, now U.S. Pat. No. 6,922,677; and (c) U.S. patent application Ser. No. 10/987,583 filed on Nov. 12, 2004, now U.S. Pat. No. 7,848,985, which is a continuation application of U.S. patent application Ser. No. 09/275,758, now U.S. Pat. No. 6,922,677.

FIELD OF THE INVENTION

The present invention pertains in general to financial investments and in particular to such investments which base their return on a combination of notional portfolios through which market exposure is acquired, and adjusted as indicated by a predetermined mathematical formula, through the use of derivatives, thereby permitting a multiple utilization of capital.

BACKGROUND OF THE INVENTION

Financial products have increasingly emphasized the value of diversification. Modern Portfolio Theory has demonstrated that over time a diversified portfolio, by reducing the incidence of major drawdowns, can generate high cumulative returns with reduced volatility (a commonly-used measure of risk), as compared to conventional portfolios consisting of stocks and bonds. "Non-traditional" investments are incorporated into an investment strategy because they are likely to demonstrate a significant degree of performance non-correlation to a "base portfolio," typically the general equity and/or debt markets. By combining nontraditional and traditional portfolio components, an "efficient frontier" of investment performance can be developed in which the addition of the non-traditional component increases returns while also reducing volatility up to the point of the desired level of portfolio efficiency (risk/reward ratio) and maximum non-traditional exposure.

One of the difficulties in implementing the diversification strategy of Modern Portfolio Theory has been to identify a reliably non-correlated and positively performing non-traditional investment instrument or class. Diversifying into a non-traditional investment can reduce volatility but not ultimately benefit a portfolio if the non-traditional investment is not profitable. In addition, many non-traditional investments have not, in fact, proved to be noncorrelated with the broader markets, especially during periods of market stress (when the risk control benefits of diversification are potentially of the most importance).

Modern Portfolio Theory was developed in the 1950s. In the early 1960s, published financial portfolio research demonstrated that managed futures might serve as a non-traditional "asset class" for purposes of diversifying a traditional portfolio in a manner consistent with the tenets of such Theory. Since that time, while futures/commodities have been increasingly accepted as a means of diversifying traditional portfolios, the dominant approach to incorporating futures into a portfolio has focused on the use of managed futures-futures accounts actively managed by professional "Commodity Trading Advisors" and "Commodity Pool Operators." The futures markets provide efficient and leveraged access to a wide range of potentially non-correlated assets. However, the performance of managed futures products has been unreliable. Whether managed on a discretionary basis or pursuant to computer models, actively managed futures strategies have demonstrated significant periods of under-performance. Furthermore, even when a managed futures investment is successful, it is impossible to predict with any confidence what its likely near- to mid-term performance will be. This uncertainty means that it is impossible to know whether any given non-traditional investment will be (1) profitable and/or (2) non-correlated with an investor's base portfolio.

A related impediment to the efficient implementation of Modern Portfolio Theory investment products through the use of non-traditional investments is that nontraditional investment portfolio managers typically regard both their strategies and their market positions as proprietary and confidential. Uncertainty of performance is combined with uncertainty as to holdings and methods of strategy implementation. These uncertainties have caused many institutions (especially those which believe that their fiduciary obligations to their investors or beneficiaries require that they have access to position data) to avoid non-traditional investments. The "entry barrier" of not providing trade transparency is heightened because most actively managed non-traditional strategies are subject to a nonquantifiable "risk of ruin"—the possibility of sudden and dramatic losses of a large percentage of an overall portfolio. In today's market environment, this is a particularly topical concern due to the massive and wholly unexpected losses suffered by a number of non-traditional, "hedge funds" in 1998, many of which had previously exhibited excellent risk/reward characteristics. "Risk of ruin" is not generally considered to be a component of traditional equity and debt investments, and can be best monitored by "real time" knowledge of strategies and positions.

Finally, non-traditional investment alternatives are frequently highly illiquid. Many non-traditional strategies have a statistically significant incremental likelihood of success the longer the time horizon of the strategy cycle. This is especially the case with relative value, quasi-arbitrage methodologies but is characteristic of many nontraditional approaches As a result, many non-traditional investments require investment commitments of 12 months or longer, eliminating investors' ability to limit their losses or adjust portfolio exposure by terminating or reducing their investment.

The present invention provides a non-traditional investment instrument which eliminates the illiquidity and trade non-transparency of many alternative non-traditional investments and which has produced consistently successful and non-correlated performance over 37 years of researched price histories.

SUMMARY OF THE INVENTION

One embodiment provides a computer implemented investment product that includes data stored on one or more computers that corresponds to a notional performance portfolio of assets. The notional performance portfolio includes: (a) a base portfolio of assets having a selected exposure amount; (b) a passive commodity index portfolio, of long and short positions, having a passive commodity index portfolio exposure in an amount substantially equal to a product of the selected exposure amount multiplied by a leverage factor of at least 100%; and (c) the notional performance portfolio having a lower risk and a higher return as compared to either the base portfolio or the passive commodity index portfolio. The one or more computers monitor the base portfolio and the passive commodity index portfolio and calculate the return for the notional performance portfolio.

Another embodiment of the present invention provides a computer adapted to manage a computer implemented investment product that includes a computer and data stored on the computer that corresponds to a notional performance portfolio of assets. The notional performance portfolio of assets includes: (a) a base portfolio of assets having a selected exposure amount, (b) a passive commodity index portfolio, of long and short positions, having a passive commodity index portfolio exposure in an amount substantially equal to a product of the selected exposure amount multiplied by a leverage factor of at least 100%, and (c) the notional performance portfolio having a lower risk and a higher return as compared to either the base portfolio or the passive commodity index portfolio. The computer monitors the base portfolio and the passive commodity index portfolio, and calculates a return of the notional performance portfolio.

Yet another embodiment of the present invention provides a computer implemented investment product having data stored on one or more computers that corresponds to a notional performance portfolio of assets. The notional performance portfolio includes: (a) a base portfolio of assets comprising T-bills having a selected exposure amount; (b) a passive commodity index portfolio, of long and short positions, having a passive commodity index portfolio exposure in an amount substantially equal to a product of the selected exposure amount multiplied by a leverage factor of at least 100%; and (c) the notional performance portfolio having a lower risk and a higher return as compared to the passive commodity index portfolio. The one or more computers monitor the base portfolio and the passive commodity index portfolio and calculate the return for the notional performance portfolio.

A selected embodiment of the present invention is a unitary investment swap instrument. The swap creates a notional performance portfolio, based on a substantially smaller amount actually deposited as collateral, which represents a multi-asset portfolio and determines the return to the investor over a predetermined period of time. The performance portfolio, at the initiation of the predetermined time period, comprises a base portfolio, which may be equity based, and a passive commodity index portfolio, of long and short positions. The passive commodity index portfolio creates an exposure in an amount substantially equal to the product of the base portfolio exposure amount and a leverage factor, which together define a commodity index portfolio exposure. The commodity exposure may be subject to periodic adjustment. The return to the investor comprises substantially the change in value of both the base portfolio exposure and the commodity index portfolio exposure over the predetermined period of time. The investor may also receive interest earned on the collateral deposit.

A further embodiment of the present invention is a unitary investment note instrument which includes an investment principal amount that is invested in the instrument. A predetermined maturity date defines the time period over which the change in a notional performance portfolio is measured. The change in value of the performance portfolio, reduced by the application of a payout factor, determines the return to the investor for the instrument. The issuer of the note guarantees that the investor will receive back at least the amount of the investment principal at the end of the term. The performance portfolio, at the initiation of the predetermined time period, comprises a base portfolio, which may be equity based, having an exposure in an amount substantially equal to the investment principal and a passive commodity index portfolio, of long and short positions. The passive commodity index portfolio creates an exposure in an amount substantially equal to a product of the base portfolio exposure amount and a leverage factor, which together define a commodity index portfolio exposure. The return to the investor, in addition to the investment principal, comprises the product of (1) substantially the change in value of the base portfolio exposure and the commodity index portfolio exposure over the predetermined time period and (2) a payout factor, which is typically less than one.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The preferred embodiments of the present invention utilize two well-established and independently maintained financial indices (although it is not necessary that a financial index be used as the benchmark). These are the Standard & Poor's 500 Stock Index (referred to as the "S&P") of large capitalization U.S. stocks and the Mount Lucas Management Commodity Index (referred to as the "MLM"). Those skilled in the art will recognize that other indices can be used. For example, the S&P Diversified Trends Indicator ("DTI") can be substituted for the MLM as used herein.

The S&P is a widely-used index. It is employed in the preferred embodiments of the present invention rather than the (at least) equally familiar Dow Jones Industrial Average due to the significantly greater liquidity of derivative instruments available on the S&P. This liquidity is important to the design of instruments of the present invention because the banks and dealers which may issue these instruments reflect market liquidity (which, in turn, is directly reflected in the costs incurred by such banks and dealers in hedging their risks under the present invention instruments) in the pricing of such instruments. The higher the hedging transaction costs imposed on the issuers of the subject instruments, the lower the efficiency of these instruments to the investor.

The MLM tracks 25 different commodities/futures including 6 currencies, 3 U.S. bonds and 16 traditional commodities (collectively, the "MLM Objects"). The MLM is an unleveraged index which has been analyzed over 38 years of price histories and has been used to manage institutional accounts since 1993. It is comprised of long and/or short positions in each of the 25 MLM Objects, each with an equal dollar value, rebalanced monthly (this internal rebalancing of the MLM is not to be confused with the rebalancing of the base portfolio exposure of the swap instrument by adjusting that exposure to reflect the performance of both the base and passive commodity index portfolios, see below). All MLM positions are established as long or short on the basis of a straightforward trend following model as of the beginning of each month and held until month-end; no trades occur intra-month. A long position is taken if the current spot price is above the average month-end spot price during the past 12 months (indicating an upward price trend); otherwise a short position is taken. There is no discretionary input into the MLM; consequently, it can be mathematically applied to historical market data to generate researched price histories.

The MLM does not function as an all long commodity price index. On the contrary, because it acquires both long and short positions in the various MLM Objects, the performance of the MM is substantially non-correlated to overall commodity prices, adding a further dimension to the diversification of the instruments of the present invention.

The present invention creates, not by active management but by the application of a passive index, a nontraditional portfolio component which has a statistically high likelihood of both non-correlation to traditional market indicators and superior performance. The MLM is an unusual type of passive index in that unlike the standard commodities indices— the Commodity Research Bureau Index and the Goldman Sachs Commodity Index—the MLM takes both long and short positions in the different MLM Objects. In historical simulations, as well as actual institutional account performance since 1993, the results of the MLM have substantially outperformed the all-long commodities indices as well as exhibiting significantly greater diversification effects when combined with the S&P. Certain combinations of the MLM and the S&P, mathematically adjusted on a periodic basis pursuant to the present invention, have yielded returns and risk control parameters substantially superior to either index (S&P and MLM) considered on a stand-alone basis as well as substantially superior to many alternative combinations of non-traditional and traditional investments. Furthermore, due to the liquidity of the MLM Objects and the resulting ease with which the MLM can be hedged, the present invention can be provided by a large number of different banks and dealers on competitive economic terms.

An index of the type represented by the MLM is referred to herein as a passive, long and short, commodity index. The essential aspects of such an index are that (1) it is primarily based on commodities, (2) it is passive, which means it is determined by a formula rather than active management, and (3) it takes both long and short positions.

The use of a passive index eliminates any uncertainty as to how the instruments of the present invention will perform under any given market scenarios while also allowing total transparency of trading positions and strategies. In addition, the present invention is able to adjust to a wide range of different end-user risk/reward tolerance levels by permitting wide flexibility in adjusting both initial leverage and the ratio of base portfolio exposure to passive, long and short, commodity index portfolio exposure. Once initially calibrated, instruments of the present invention perform robotically in accordance with the performance exposure and risk components designed into the initial parameters.

Investment instruments pursuant to the preferred embodiments of the present invention are internally diversified when considered as a stand-alone (unitary) investment, each combining the S&P and the MLM. In addition, the overall investment represents a diversification from traditional portfolio components.

Investors may redeem investments of the present invention at any time (subject to the possible imposition of a redemption charge in the case of the note investment instrument). The ability to redeem combined with total trade transparency provides investors with a layer of risk control unavailable in most non-traditional investment alternatives.

Because of the passive character of the indices incorporated in the present invention, it is also possible to fix the costs applicable to these instruments at the time each instrument is designed. Changes in market conditions subsequent to product inception have no effect on the pricing to the investors. This eliminates the risk that a material increase in market volatility (and, accordingly, the hedging cost to the issuer of an instrument of the present invention) will result in a commensurate increase in embedded costs, and corresponding degradation of investment potential. Actively managed non-traditional investments, on the other hand, can be subject to extreme variability of costs, a feature which is especially unacceptable to institutional investors when they are denied access to the trade information necessary to monitor the actual level of transactions being executed.

The performance of the MLM cannot be predicted in the abstract; however, given any assumed market movements, this performance can be determined with high probability. This enables investors to apply market sensitivity analysis—a basic method of quantifying market risk exposure—to the positions held by the instruments of the present invention with a high degree of accuracy. On the other hand, it is not possible to conduct reliable market sensitivity, "value at risk" or Monte Carlo simulation market exposure analysis on most actively managed alternative investment products. The "risk of ruin" in instruments of the present invention can be clearly quantified; in most non-traditional investments it is effectively unknowable.

Statistical analysis also indicates a remarkably high degree of non-correlation between the S&P, as well as overall debt market indices, and the MLM throughout a wide range of different market cycles.

The use of the MLM in combination with an investor's base portfolio addresses many of the difficulties encountered to date in incorporating non-traditional investments as a "mainstream" component of traditional portfolios.

FIGS. 1-4 generally indicate a progressive time period going from the top to the bottom of each Figure. The base portfolio exposures and passive, long and short, commodity index portfolio exposures are separated horizontally although they are part of the unitary investment instruments of the present invention.

Figure 1:
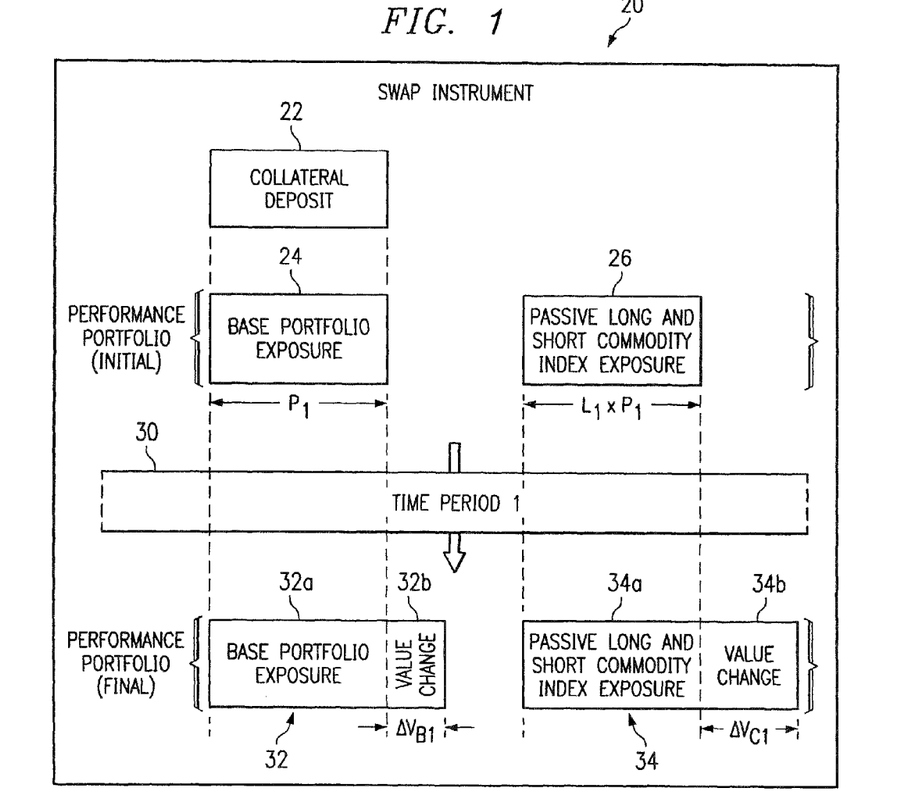
FIG. 1 is a block diagram illustrating a swap instrument in accordance with the present invention.

Referring to FIG. 1, there is illustrated a swap instrument 20 in accordance with the present invention. An investor who wishes to utilize the swap instrument 20 provides a collateral deposit 22 having a specified dollar value. This collateral may be deposited in the full amount of a base portfolio exposure 24 or in a greater or lesser amount as negotiated between the swap issuer and an investor or a manager representing the investor.

The return provided to the investor is measured by a notional performance portfolio which comprises the base portfolio exposure 24 and a passive, long and short, commodity index exposure 26. The face amount of the base portfolio exposure 24 is identified by the term $P_1$ The face amount of the passive commodity index exposure 26 is the product of a leverage factor $L_1$ and the base portfolio exposure $P_1$.

The leverage factor L, is determined by a formula that is based on the performance of the selected commodity index used for the commodity exposure 26. If the commodity index performance in the preceding 12 months (or other period of time) equaled or exceeded 15% (in the case of the MLM under market conditions in late 1998, using a different commodity index and/or under different market conditions, this figure could vary from 15%), L, is selected to be 150%, but if the total performance of the selected commodity index is less than 15% during the preceding 12 months (or other period of time), the leverage factor L, is selected to be 300%. These are preferred leverage factors, but other leverage factor values may also be used.

The swap instrument 20 includes a predetermined time period 30 which preferably is one year. Typically, the instrument 20 is not terminated at the end of one year, but is reset as further described with reference to FIG. 2.

The initial performance portfolio for the swap instrument 20 comprises the base portfolio exposure 24 and the passive, long and short, commodity index exposure 26. After the time period 30 has elapsed, the final performance portfolio comprises a base portfolio exposure 32 and a passive, long and short, commodity index exposure 34. The base portfolio exposure 32 has two components which are the original exposure 32a and a value change 32b. Likewise, the commodity index exposure 34 has an original component 34a and a value change 34b.

The return for the time period 30 has two components. The first comprises the value change 32b which is expressed as the term $\Delta V_{B1}$. The passive, long and short, commodity index exposure 34 has a value change 34b which is expressed as the term $\Delta V_{C1}$. Thus, the return on the swap instrument 20 for the time period 30 is represented by the sum of $\Delta V_{B1}$ and $\Delta V_{C1}$. Should the instrument terminate at the end of one year, the investor would receive back the amount of the collateral (which mayor may not be equal to the base portfolio exposure 24), plus interest (if applicable) on such collateral, together with the total change in value represented by $\Delta V_{B1}$ plus $\Delta V_{C1}$.

The example shown in FIG. 1 represents a positive increase in value of the notional portfolio exposures 24 and 26. It is, of course, possible that the values of these exposures could decrease over time, and the value changes represented by the return for a given period could be negative. Such negative amounts would be paid to the instrument issuer from the collateral 22 deposited to initiate the swap. The collateral 22 supporting the swap is not, however, the maximum which the investor can lose. Losses in excess of the collateral must be paid by the investor to the swap issuer.

Figure 2:
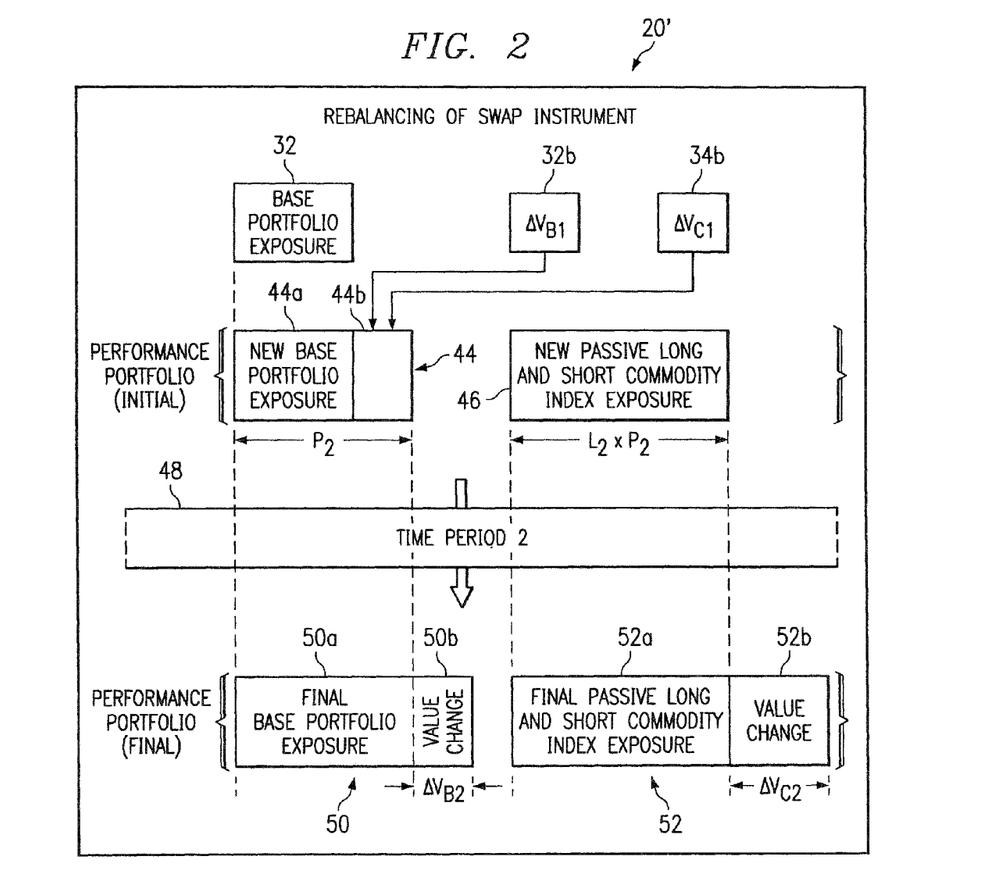
FIG. 2 is a block diagram illustrating the rebalancing and leverage adjustment mechanism of the swap instrument.

At the end of the time period 30, the swap instrument 20 is subject to rebalancing as illustrated in FIG. 2. The rebalancing is optional in that it occurs only if the instrument 20 extends beyond the first time period 30. The rebalancing aspect is referenced as a swap instrument 20' in FIG. 2. The first step in the process of rebalancing the swap instrument 20' is to determine the net asset value (NAV) of the instrument 20 at the end of the time period 30. This comprises the sum of the collateral deposit 22, the interest on this collateral deposit, and the value changes 32b and 34b. The sum of these four quantities (interest may, however, be paid out to the investor and, accordingly, equal zero for these purposes) becomes the rebalanced base portfolio exposure 44. Exposure 44a comprises the collateral deposit and interest (if not paid out) and exposure 44b comprises the value changes 32b and 34b. The amount of base exposure 44 is represented by the term $P_2$.

A new passive, long and short, commodity index exposure 46 has a value that is the product of a new leverage factor $L_2$ and the rebalanced base exposure value $P_2$. The leverage factor $L_2$ is determined in the same manner as described above for the factor $L_1$, but calculated at the end, rather than as of the beginning (as in the case of the swap instrument 20), of time period 30. The leverage factor $L_2$ has a value of either 150% or 300% depending on the performance of the referenced commodity index over the preceding 12 months (or other period of time). At the end of a time period 48 (time period 2), which may be of the same duration as the time period 30, the final performance portfolio comprises a new base portfolio exposure 50 and a new passive long and short commodity index exposure 52. The base portfolio exposure 50 has a base exposure 50a and a change in value 50b. The commodity exposure 52 has a base exposure 52a and a change in value 52b. The return for the time period 48 is the change in value 50b, which is expressed as the term $\Delta V_{B2}$, and the change in value 52b which is expressed by the term $\Delta V_{C2}$, plus interest on the collateral deposited to support the swap.

The process illustrated in FIG. 2 can be repeated for as many time periods as desired wherein for a third time period the value change 50b replaces the value change 32b, the value change 52b replaces the value change 34b, and the base portfolio exposure 50 replaces the base portfolio exposure 32. Typically, the swap instrument 20 will be selected to have a yearly time period for releveraging and rebalancing and a duration of 5-7 years.

A numerical example for the swap instrument 20, as shown in FIGS. 1 and 2, is now presented. For this example, the collateral deposit 22 comprises $10 million and is assumed to equal the amount of the initial base portfolio exposure 24. Consequently, the base portfolio exposure 24 comprises an stock index notional amount of $10 million. Assuming that the leverage factor $L_1$ is the high leverage factor of 300%, the notional commodity index exposure 26 is $30 million. Assume that at the end of time period 30 the base portfolio exposure 24 increased in value by $1 million and the passive commodity index exposure 26 increased in value by $500,000. The value change 32b would be $1 million and the value change 34b would be $500,000. Therefore, should the swap instrument 20 be terminated at the end of the first year, the return to the investor would be $1.5 million and the investor would also receive back the amount of his collateral plus interest.

The rebalancing of the swap instrument 20' is described with reference to FIG. 2. The initial base portfolio exposure of the swap instrument 20 plus the changes in value in the base portfolio and commodity index portfolio at the end of the time period 30 was $11.5 million. The rebalanced base portfolio exposure 44 is set to be $11.5 million (in each case, disregarding interest on the collateral deposit, which may be paid out to the investor at the end of time period 30 and will vary with the nature of the collateral deposited). This value is represented by the term $P_2$. In the releveraging process, the leverage factor $L_2$ is recalculated, based on the same formula used to determine $L_1$, the initial leverage factor used to determine the initial commodity index exposure, at either 150% or 300% (one "non-enhanced" mode of this invention applies a constant 100% leveraging factor). If 150% is the result of the formula, the notional value of the rebalanced passive, long and short, commodity index exposure 46 is $17.25 million. It is $34.5 million if the 300% leverage factor is applied.

Continuing with this example, if at the end of the time period 48 the amount of the rebalanced base portfolio exposure 50 is $12 million, then the value change 50b is $500,000. If the passive, long and short, commodity index exposure 52 has a final notional value of $18.0 million and the 150% leverage factor was selected so that this exposure as of the beginning of the second time period 46 was $17.25 million, then the value change 52*b* is $750,000. Thus, the return to the investor for the period 48 would be $1.25 million. The base portfolio exposure 32*a* plus the value changes 32*b* and 34*b* at the end of time period 30 would also be returned to the investor, plus interest.

The swap instrument of the present invention has a base portfolio, which is preferably keyed to an equity index (which in the preferred embodiment is the S & P), and a passive, long and short, commodity index (which in the preferred embodiment is the MLM). The exposure to the MLM is calibrated based on the exposure of the base portfolio. Selected leverage factors for the MLM with respect to the base portfolio can be, for example, 100%, 150% or 300%. Other leverage factors as well as other means of periodically rebalancing and releveraging the two portfolios can also be applied. The diversification features of the unitary swap instrument with these leverage factors using the S&P and MLM indices is illustrated below in Table 1.

TABLE 1

SWAP INSTRUMENT MARKET SECTOR ALLOCATIONS
Percentages Are of Total Portfolio Exposure

| | S&P (Base Portfolio) | | |
|---|---|---|---|
| Equities | 50% | 40.0% | 25% |

| | MLM (Passive, Long and Short, Commodity Index Portfolio) | | |
|---|---|---|---|
| | 100% Leverage | 150% Leverage | 300% Leverage |
| Bonds | 6% | 7.2% | 9% |
| Currencies | 12% | 14.4% | 18% |
| Energy | 8% | 9.6% | 12% |
| Grains | 10% | 12.0% | 15% |
| Other Agricultural | 8% | 9.6% | 12% |
| Metals | 6% | 7.2% | 9% |
| | 100% | 100% | 100% |

The swap instrument 20 is not a limited liability investment. In highly unusual market environments, investors could be liable for margin calls in addition to the collateral deposit. This possibility, no matter how remote, may be unacceptable to many institutional investors. Consequently, an optional feature for the present invention has been structured in the form of a 5% "out of the money" put option offered either by the swap issuer or by a third party dealer, effectively limiting investors' maximum loss on the MLM component to 5% for each unit (corresponding to the base portfolio exposure) of MLM leverage employed. At current market rates (late 1998), the premium cost of this option is approximately 4.50% for each unit of MLM leverage used (6.75% at 150% MLM leverage or 13.50% at 300% MLM leverage). The worst case MLM loss would equal the loss of the premium (which is non-refundable irrespective of MLM performance) plus 5% on each unit of MLM leverage employed, or 14.25% at 150% MLM and 28.50% at 300% MLM. Accordingly, unless the S&P (or other base portfolio) component declined by more than 85.75% or 71.50%, respectively, no additional margin payments would be required (assuming the base portfolio exposure had been 100% collateralized).

Figure 3:
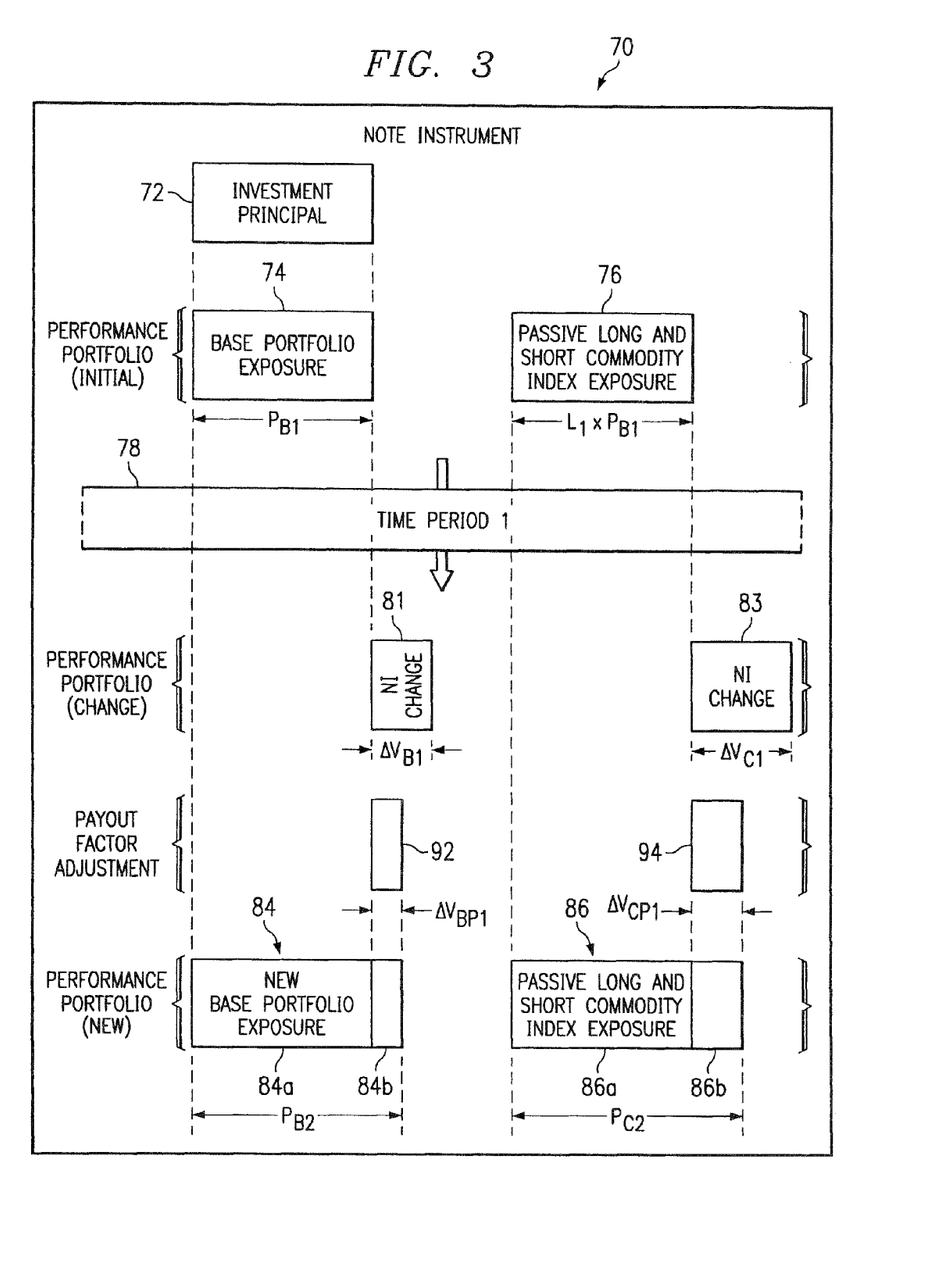
FIG. 3 is a block diagram illustrating a note instrument in accordance with the present invention.

A further embodiment of the present invention is illustrated in FIG. 3. This comprises a note instrument 70 that has an investment principal 72 (which constitutes an actual investment, not only a deposit of collateral and, accordingly, cannot have a notional component). The investment principal 72 may be any financial instrument, e.g., stocks, bonds, T-bills, cash, currencies, mortgages, any other security, or a combination thereof. The note instrument 70 includes a performance component, which at the beginning of an initial time period comprises a base portfolio exposure 74 together with a passive, long and short, commodity index exposure 76. The amount of the base portfolio exposure 74 is identified by the term $P_{B2}$, which is substantially equal to the amount of the investment principal 72.

The amount of the passive commodity index exposure 76 is a product of a leverage factor $L_1$ and the exposure $P_{B1}$. For the note instrument 70, a different formula is used for calculating the value of the leverage factor than is used in the case of the swap instrument 20. The preferred leverage factors are as low as 200% or as high as 400%. The leverage factor is selected to be as low as 200% if the performance over the preceding 12 months (or other period of time) of the selected commodity index equaled or exceeded 15%. This is the case for the MLM under market conditions in late 1998. Using a different commodity index and/or under different market conditions, this 15% figure could vary. If the total rate of return was less than 15%, a leverage factor of as high as 400% is selected. Thus, depending upon the performance of the referenced commodity index over the preceding 12 months (or other period of time), the amount of the exposure 76 is either as low as two or as high as four times the amount of the base portfolio exposure 74. These are preferred leverage factors, but other leverage factors may also be used.

The note instrument 70 has a defined period to maturity, often as long as 10 years. However, the leverage factor applicable to the commodity index component (as low as 200% or as high as 400%) may be adjusted periodically while the note is outstanding (typically as of each anniversary of the note's issuance). Upon the expiration of the time period 78 between leverage adjustments if any, the performance component has a final value which comprises a base portfolio exposure 84 having a value of $P_{B2}$ and a passive long and short commodity index exposure 86 having a value $P_{C2}$.

At the end of the time period 78, the base portfolio exposure 74 has experienced, on a notional basis, notional index (NI) change 81, which is represented as $\Delta V_{B1}$, and the commodity index exposure 76 has a notional index (NI) change 83 which is represented as $\Delta V_{C1}$.

A fundamental aspect of the note instrument 70 is that there is a guaranteed return to the investor of the investment principal 72 at the maturity date of the note. As a result of this guarantee, the investor agrees to accept less than the full notional index (NI) change in value of the base portfolio exposure and of the passive, long and short, commodity index exposure.

The notional changes to the base portfolio and the commodity index portfolio exposures is adjusted by a payout factor, which typically is a number less than one, in determining the return recognized by the note on these portfolios. This is due to the fact that it would not be economically feasible for the note issuer to hedge the full return on the notional base portfolio and commodity portfolio exposures and still guarantee the return of the note's full investment principal at the maturity date. An example of such a payout factor (which would in fact have been the payout factor in late 1998 based on then current market volatility levels—the payout factor reflects hedging costs which generally increase with volatility) is 40%, also expressed as 0.4. Application of the payout factor, such as 40%, results in a payout factor adjustment to produce a payout value 92 that is a product of the notional index change 81 and the payout factor. Likewise, there is a payout value 94 which is the product of the 0.4 payout factor and the notional index change 83. The payout factor on both the base portfolio and the passive, long and short, commodity index portfolio is the same and does not change throughout the lifetime of the note. The notional index changes 81 and 83 have no direct effect on the value of the note. Only payout adjusted value changes 92 and 94 are reflected in the note's net asset value. The total return to the investor, if the note instrument 70 is terminated at the end of the time period 78, comprises the investment principal 72 together with the payout value 92 and payout value 94 (unlike the swap instrument 20, no interest accrues to the investor on the investment principal of the note instrument 70; this principal, as in the case of any note, is paid to the issuer of the note and becomes the property of the issuer; it does not remain the property of the investor; if interest is earned on this principal, it belongs to the issuer, not to the investor). The total payout can be expressed as the sum of $\Delta V_{BP1}$ and $\Delta V_{CP1}$.

The payout factor is a function of the leverage. If the leverage is selected to be relatively low, the payout factor can be greater than one.

In addition, while the note instrument 70 can be releveraged each year, it is not rebalanced. The base portfolio and the passive commodity index components, separately, increase or decrease during each year. The performance of the base portfolio, cumulating year-to-year, determines, as of each anniversary (or other period) of the note's issuance, the base portfolio exposure for the subsequent year (or other period); the performance of the passive commodity index portfolio cumulating year-to-year, determines, as of each anniversary (or other period) of the note's issuance, the passive commodity portfolio unit to which the releveraging formula is then applied as of the beginning of each year (or other period).

The final performance base portfolio exposure 84 comprises a base portfolio exposure 84a, and a value change 84b which is equal to the payout value change 92—i.e., notional index change 81 multiplied by the payout factor. A final commodity index exposure 86 comprises a passive commodity exposure 86a, which is equal to the commodity index exposure 76, and a value change 86b, which is equal to the payout value change 94—i.e., notional index change 83 multiplied by the payout factor.

Figure 4:
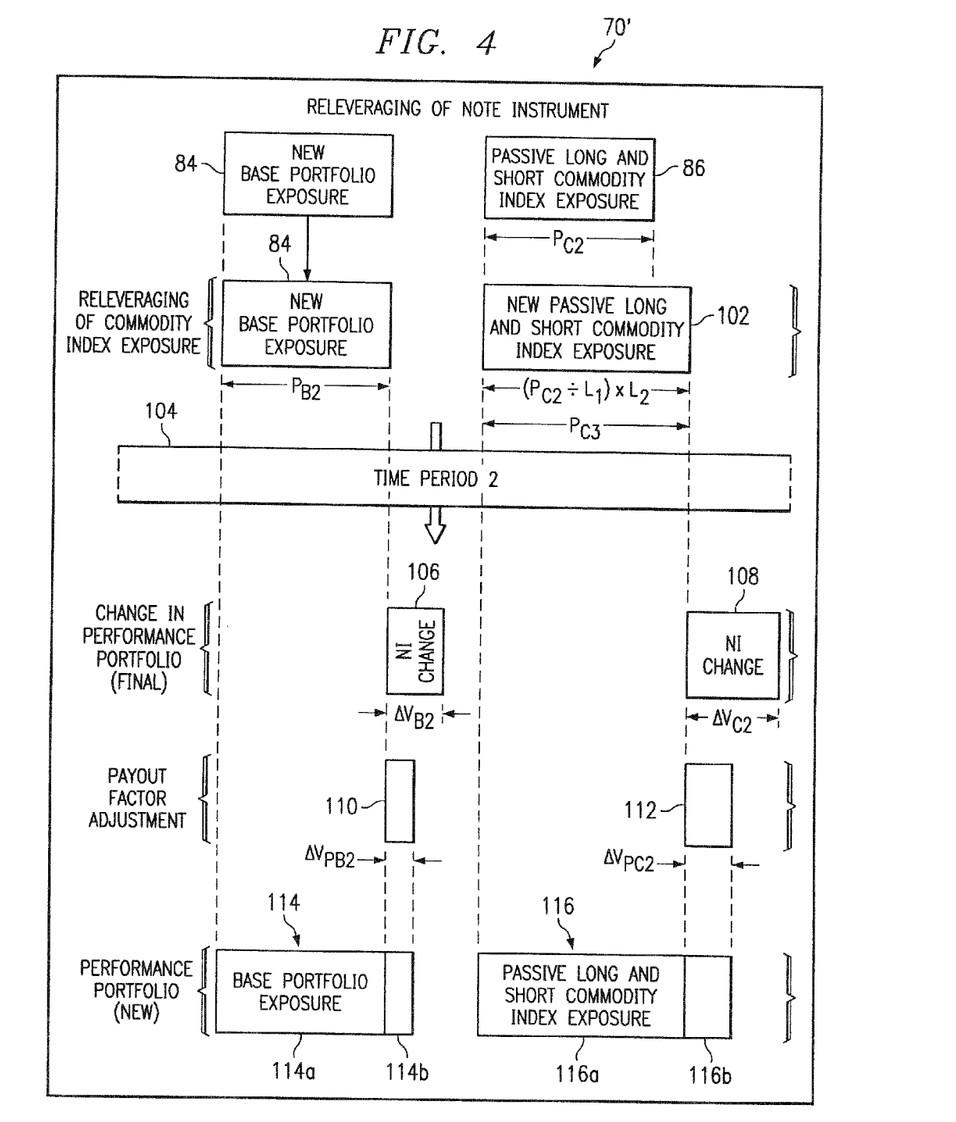
FIG. 4 is a block diagram illustrating the leverage adjustment mechanism of the note instrument.

In a typical case, the note 70 will have a multiple year duration, for example 10 years. However, at the end of a shorter period, such as one year, the investment note 70 can be releveraged as shown in FIG. 4 where the note is referenced as instrument 70'. The leverage factor applied to the commodity index portfolio component of the note 70 can be fixed for the duration of the note, however, as an option, the leverage may be changed on a periodic basis, such as yearly. The illustration in FIG. 4 represents the releveraging of the commodity index exposure of the note 20 at the end of the first year (or other period) and the start of the second year (or other period) after the note's issuance. At the end of the first year (or other period) the value of the base portfolio, as shown by the base portfolio exposure 84, is represented by the value $P_{B2}$. At the end of the first year (or other period) the commodity index exposure has resulted in a value represented by $P_{C2}$. The note 70' is releveraged by changing the leverage factor for the commodity index exposure. There is no leveraging adjustment made to the base portfolio exposure 84. The releveraged commodity index exposure is shown by reference numeral 102.

The releveraging to produce the commodity index exposure 102 is effected using the same formula utilized initially to determine the leverage factor for the commodity index exposure 76, as described above in reference to FIG. 3. The ending value of the passive commodity index portfolio 86 is divided by the leveraging factor used in the prior year (or other period) to calculate a "unit" of passive commodity index exposure. That unit is then multiplied by the new leverage factor, determined as previously described, to establish the commodity index portfolio exposure for the new year (or other period) represented by exposure 102. For the present example, the initial leveraging factor applied to the commodity index exposure 76 is referenced as $L_1$, which may be assumed to be 200%. If the newly calculated leverage factor $L_2$ is assumed to be 400%, then the passive commodity index exposure 102 will be twice as large as the passive commodity index exposure 86 and also greater than the initial passive commodity index exposure of 76 (barring a greater than 50% loss in the passive, long and short, commodity index exposure in time period 78). The value ($P_{C3}$) of the commodity index exposure 102 is determined by the formula $P_{C3}=(P_{C2}\div L_1 \times L_2)$. If $L_1$ and $L_2$ are respectively 200% and 400%, then the value $P_{C3}$ will be $2\times P_{C2}$. Should the original value of $L_1$ be 400% and $L_2$ is 200%, then $P_{C3}$ will be 0.5% of $P_{C2}$. $P_{C2}$ reflects the performance of the passive commodity index portfolio in the time period 78. Alternatively, the new leveraging factor $L_2$ can be applied to the sum ($P_{B1}+86_b$) rather than to ($P_{C2}\div L_1$).

Upon expiration of the second time period 104, there is a notional index change 106 ($\Delta V_{B2}$) in the base portfolio exposure 84 and a notional index change 108 ($\Delta V_{C2}$) in the commodity portfolio exposure 102. These notional index changes are adjusted by a payout factor (40%) to yield a payout adjusted value change 110 ($\Delta V_{BP2}$) and a payout adjusted value change 112 ($\Delta V_{CP2}$).

After the expiration of the time period 104, the second time period, there is produced a final base portfolio exposure 114 having a basic component 114a and a value change 114b equal to the payout adjusted change in value 110 for the base exposure, which is represented by the term $\Delta V_{BP2}$. Likewise, following the completion of time period 104, there is produced a final passive, long and short, commodity index exposure 116 having a basic component 116a and a value change equal to the payout adjusted change in value 112 for the commodity index exposure, which is represented by the term $\Delta V_{PC2}$.

The return to the investor equals $\Delta V_{BP2}$ plus $\Delta V_{CP2}$.

The leverage factor applied to generate the commodity index exposure 102 can be constant, the same as was applied to generate commodity index exposure 76, or it can be the result of the changes in the leverage factor effected periodically over the life of the note instrument 70' with releveraging performed as described above in reference to FIG. 4.

A numerical example for the note instrument 70 as shown in FIGS. 3 and 4 is now presented. In this example, the investment principal 72 is $10 million. Therefore, the base portfolio exposure 74 has a value of $10 million. For this present example, the leverage factor $L_1$ is assumed to be in the lowest mode of 200%. Thus, the passive commodity index exposure 76 is $20 million. If during the time period 78, the passive commodity index exposure 76 increases to $30 million, the notional index change 83 would be $10 million and the payout adjusted value change, i.e., the return to the investor would be $10 million multiplied by the payout factor, which is assumed to be 40%. This would result in a value of the commodity index exposure 86 of $20 million plus $4 million for a total of $24 million.

If during the time period 78 the notional base portfolio exposure 74 increased to $12 million, the notional index change 81 would be $2 million and the return to the investor would be $2 million multiplied by the payout factor which is assumed to be 40%. This would result in a value of the base portfolio exposure 84 of $10 million plus $0.8 million for a total of $10.8 million.

Based on the results in time period 1 (78), $10.8 million would be the value of the base portfolio exposure 84. No leveraging adjustment would be made to this base portfolio. The commodity index exposure 86 as of the end of time period 1, an amount of $24 million, would be subject to a leveraging adjustment depending on the performance of the commodity index during the preceding 12 months (or other period of time). If the positive change in this index equaled or exceeded 15% during the preceding 12 months (or other period of time), $L_1$ (the lowest leverage factor) would again be applied and the commodity index exposure would remain at $24 million (alternatively, this leveraging factor could be applied to the sum ($P_{B1}$+86b), i.e., ($10 million+$4 million), for a $P_{C3}$ value of $28 million. If, however, the positive change in the commodity index was less than 15% during the preceding 12 months (or other period of time), $L_2$ (the high leverage factor) would be applied. Accordingly, the commodity index exposure 86 at the end of time period 1, an amount of $24 million, would be divided by $L_1$ (200%) to determine the notional value of a "unit" of commodity index leverage. This unit was initially equal to the base portfolio exposure 74, and during time period 78 the total commodity index exposure 76 was 2 units of commodity index leverage, as $L_1$ equaled 200%. In order to determine the value of this unit as of the beginning of time period 104, the commodity index exposure 86 is divided by the $L_1$ leveraging factor initially applied to the initial unit of commodity index exposure (equal to the base portfolio 74). The result, ($24 million-2) or $12 million, is then multiplied by the new leveraging factor $L_2$ (400%) to generate a new commodity index exposure 102 of $48 million. Alternatively, this leveraging factor could be applied to the sum ($P_{B1}$+86b) i.e., the initial unit of commodity index exposure plus $\Delta V_{CP2}$ to generate a new commodity index exposure of $56 million.

If during time period 104, the passive commodity index exposure 102 increases to $60 million, the notional index change 108 would be $12 million and the payout adjusted value change 112 would be $4.8 million. This would result in a commodity index exposure 116 of $52.8 million. If during time period 104, the notional base portfolio exposure 84 increased to $15 million, the notional index change 106 would equal $4.2 million and the return to the investor would be $4.2 million multiplied by the payout factor which is assumed to be 40%. This would result in a value of the base portfolio exposure 114 of $10.8 million plus $1.68 million for a total of $12.48 million.

The note instrument of the present invention comprises a combination of a base portfolio, preferably keyed to an equity index (which in the preferred embodiment is the S&P), and a passive, long and short, commodity index (which in the preferred embodiment is the MLM). Selected leverage factors for the MLM with respect to the base portfolio are as low as 200% and as high as 400%. Other leverage factors, as well as other means of releveraging the two portfolios can also be applied. The diversification features of a unitary note instrument with these two leverage factors using the S&P and MLM indices is illustrated below in Table 2.

TABLE 2

NOTE INSTRUMENT MARKET SECTOR ALLOCATIONS
(Percentages Are of Total Portfolio Exposure)

|  | S&P (Base Portfolio) | |
| --- | --- | --- |
| Equities | 33.3% | 20% |
|  | MLM (Passive, Long and Short, Commodity Index Portfolio) | |
|  | 200% Leverage | 400% Leverage |
| Bonds | 8.00% | 9.6% |
| Currencies | 16.60% | 19.2% |
| Energy | 10.67% | 12.8% |
| Grains | 13.33% | 16.0% |
| Other Agricultural | 10.07% | 12.8% |
| Metals | 8.00% | 9.6% |
|  | 100.00% | 100.0% |

The investments of the present invention differ from most alternative investments in that they provide total trade transparency to the investors. At any given time, the investors holding these instruments not only know what underlying positions are currently held as components of their investment instruments, but also what positions will be held until the end of the current calendar month, when the MLM internally rebalances its positions.

The swap instrument periodically rebalances its base portfolio exposure to an amount equal to the initial base portfolio exposure adjusted for performance since inception. The swap instrument then re-establishes its passive commodity index exposure by applying the appropriate leverage factor, as determined by the performance of the commodity index over the preceding 12 months (or other period of time), to this rebalanced base portfolio exposure.

The note instrument's base portfolio and passive commodity index portfolio exposure are not rebalanced, but simply reflect the performance of each such portfolio, considered separately, since inception. Because of the note instrument's guarantee of the return of investment principal as of the maturity date, it would not be economically feasible for the note issuer to hedge the risk of rebalanced portfolios.

Both the swap and the note instrument can be periodically releveraged in terms of the relative exposure of the overall instrument to its base and passive commodity index portfolios.

A reporting and accounting system can provide daily and intra-day trading positions and net asset value information directly to investors, as well as calculating all fees embedded in the investment instruments. Moreover, as will be recognized by those skilled in the art, computers and computer systems and the associated software currently used in the investment, banking and trading industries can be adapted to create, design, manage, monitor, trade, report and otherwise implement the financial investments, instruments and methods described herein without the need for undue experimentation.

It is not necessary that the investor acquire the "base portfolio" component of the investment instrument as a part of the instrument itself. The base portfolio may comprise a pre-existing portfolio held by an investor. Furthermore, an investor need not maintain a static base portfolio during the term of the investment instrument. Changing the make-up of the base portfolio will affect the overall results achieved, but this is not inconsistent with the invention.

The investment instruments of the present invention may be evaluated by portfolio managers as internally diversified, stand-alone investments as well as in terms of constituting non-traditional investment alternatives providing the potential for diversifying a traditional portfolio.

The parties involved in structuring the note and swap instruments, marketing these instruments, managing the rebalancing and releveraging processes, monitoring net asset values, negotiating and structuring the optional put protection available in the case of the swap instrument and issuing the swap and note instruments will receive a variety of fees from the investors. In certain cases, these fees will be paid directly by investors, outside of their investment in an instrument; in other cases, these fees will be deducted from the amount invested. These fees may include percentage fees based on the notional exposure of an instrument, or on the commodity index component thereof, as well as percentage fees based on the actual Net Asset Value of the instrument. Percentage fees may generally be assumed to range up to 3% per annum in total, but will vary on a case-by-case basis. Incentive fees based on the performance of an instrument, calculated either periodically or over the entire term of the investment, may also be charged. These fees may generally be assumed to range from 15%-25%, but will vary on a case-by-case basis. There will also be a monthly charge to reflect the issuer's costs of adjusting its hedges to reflect the monthly internal rebalancing of the MLM by executing the corresponding trades in the futures markets. A licensing fee of approximately 0.5 of 1% per annum is also payable for the use of the MLM, and, in the case of the note instrument, there is an indirect cost in the form of the loss of any interest earned on the investment principal (investors being guaranteed only the return of their principal, not any interest, as of the maturity date).

All fees and charges are subject to individual negotiation, as well as in the case of certain fees, to market conditions at the time an instrument is issued. For example, the monthly charge reflecting the hedging costs associated with the MLM's internal rebalancing as well as the payout factor are both directly affected by market volatility.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A computer implemented investment system comprising:
   one or more computers;
   data stored on the one or more computers that corresponds to a notional performance portfolio of assets comprising:
   (a) a base portfolio of assets having a selected exposure amount,
   (b) a passive commodity index portfolio, of long and short positions, having a passive commodity index portfolio exposure in an amount substantially equal to a product of the selected exposure amount multiplied by a leverage factor of at least 100%, and
   (c) the notional performance portfolio having a lower risk and a higher return as compared to either the base portfolio or the passive commodity index portfolio; and
   wherein, the one or more computers monitor the base portfolio and the passive commodity index portfolio and calculate the return for the notional performance portfolio.

2. The computer implemented investment product as recited in claim 1, further comprising:
   a rebalanced base portfolio of assets having a rebalanced base portfolio exposure in an amount substantially equal to a sum of the selected exposure amount and a change in value of the selected exposure amount and of the passive commodity index portfolio exposure over a time period; and
   a releveraged passive commodity index portfolio, of long and short positions, having a releveraged passive commodity index portfolio exposure in an amount substantially equal to a product of the rebalanced base portfolio exposure multiplied by a second leverage factor.

3. The computer implemented investment product as recited in claim 2, wherein the second leverage factor is a function of a performance of the passive commodity index portfolio over a selected period of time.

4. The computer implemented investment product as recited in claim 1, further comprising a loss limitation which limits a maximum loss an investor can incur as a result of a change in value of the passive commodity index exposure.

5. The computer implemented investment product as recited in claim 4, wherein the loss limitation comprises a put option.

6. The computer implemented investment product as recited in claim 1, wherein the base portfolio of assets is keyed to an equity index.

7. The computer implemented investment product as recited in claim 6, wherein the equity index comprises the S & P 500 Stock Index.

8. The computer implemented investment product as recited in claim 1, wherein the leverage factor is a function of a performance of the passive commodity index portfolio over a selected period of time.

9. The computer implemented investment product as recited in claim 1, wherein the leverage factor is a first leverage factor if a total return for the passive commodity index portfolio is greater than or equal to a specified return over a selected period of time and a second leverage factor if the total return for the passive commodity index portfolio is less than the specified return over the selected period of time.

10. The computer implemented investment product as recited in claim 9, wherein the first leverage factor is 300% and the second leverage factor is 150%.

11. The computer implemented investment product as recited in claim 1, wherein the base portfolio of assets comprises a pre-existing portfolio of assets held by the investor.

12. The computer implemented investment product as recited in claim 1, wherein the base portfolio of assets comprises stocks, bonds, Treasury bills (T-bills), cash, currencies, mortgages, any other security, or a combination thereof.

13. The computer implemented investment product as recited in claim 1, wherein the passive commodity index portfolio is keyed to the S&P Diversified Trends Indicator.

14. The computer implemented investment product as recited in claim 1, wherein the passive commodity index portfolio is keyed to the Mount Lucas Management Commodity Index.

15. The computer implemented investment product as recited in claim 1, wherein the passive commodity index portfolio includes bonds and currencies.

16. The computer implemented investment product as recited in claim 1, wherein the leverage factor is less than or equal to 150%.

17. The computer implemented investment product as recited in claim 1, wherein the leverage factor is less than or equal to 300%.

18. A computer adapted to manage a computer implemented investment product comprising:
a computer;
data stored on the computer that corresponds to a notional performance portfolio of assets;
the notional performance portfolio of assets comprising:
(a) a base portfolio of assets having a selected exposure amount, (b) a passive commodity index portfolio, of long and short positions, having a passive commodity index portfolio exposure in an amount substantially equal to a product of the selected exposure amount multiplied by a leverage factor of at least 100%, and (c) the notional performance portfolio having a lower risk and a higher return as compared to either the base portfolio or the passive commodity index portfolio; and
wherein the computer monitors the base portfolio and the passive commodity index portfolio, and calculates a return of the notional performance portfolio.

19. The computer as recited in claim 18, further comprising:
a rebalanced base portfolio of assets having a rebalanced base portfolio exposure in an amount substantially equal to a sum of the selected exposure amount and a change in value of the selected exposure amount and of the passive commodity index portfolio exposure over a time period; and
a releveraged passive commodity index portfolio, of long and short positions, having a releveraged passive commodity index portfolio exposure in an amount substantially equal to a product of the rebalanced base portfolio exposure multiplied by a second leverage factor.

20. The computer as recited in claim 18, wherein the second leverage factor is a function of a performance of the passive commodity index portfolio over a selected period of time.

21. The computer as recited in claim 18, further comprising a loss limitation which limits a maximum loss an investor can incur as a result of a change in value of the passive commodity index exposure.

22. The computer as recited in claim 21, wherein the loss limitation comprises a put option.

23. The computer as recited in claim 18, wherein the base portfolio of assets is keyed to an equity index.

24. The computer as recited in claim 23, wherein the equity index comprises the S & P 500 Stock Index.

25. The computer as recited in claim 18, wherein the leverage factor is a function of a performance of the passive commodity index portfolio over a selected period of time.

26. The computer as recited in claim 18, wherein the leverage factor is a first leverage factor if a total return for the passive commodity index portfolio is greater than or equal to a specified return over a selected period of time and a second leverage factor if the total return for the passive commodity index portfolio is less than the specified return over the selected period of time.

27. The computer as recited in claim 26, wherein the first leverage factor is 300% and the second leverage factor is 150%.

28. The computer as recited in claim 18, wherein the base portfolio of assets comprises a pre-existing portfolio of assets held by the investor.

29. The computer as recited in claim 18, wherein the base portfolio of assets comprises stocks, bonds, Treasury bills (T-bills), cash, currencies, mortgages, any other security, or a combination thereof.

30. The computer as recited in claim 18, wherein the passive commodity index portfolio is keyed to the S&P Diversified Trends Indicator.

31. The computer as recited in claim 18, wherein the passive commodity index portfolio is keyed to the Mount Lucas Management Commodity Index.

32. The computer as recited in claim 18, wherein the passive commodity index portfolio includes bonds and currencies.

33. The computer as recited in claim 18, wherein the leverage factor is less than or equal to 150%.

34. The computer as recited in claim 18, wherein the leverage factor is less than or equal to 300%.

35. A computer implemented investment system comprising:
one or more computers;
data stored on the one or more computers that corresponds to a notional performance portfolio of assets comprising:
(a) a base portfolio of assets comprising Treasury bills (T-bills) having a selected exposure amount,
(b) a passive commodity index portfolio, of long and short positions, having a passive commodity index portfolio exposure in an amount substantially equal to a product of the selected exposure amount multiplied by a leverage factor of at least 100%, and
(c) the notional performance portfolio having a lower risk and a higher return as compared to the passive commodity index portfolio; and
wherein, the one or more computers monitor the base portfolio and the passive commodity index portfolio and calculate the return for the notional performance portfolio.

36. The computer implemented investment product as recited in claim 35, wherein the leverage factor is greater than or equal to 300%.

* * * * *